United States Patent
Nam

(10) Patent No.: US 8,887,701 B2
(45) Date of Patent: Nov. 18, 2014

(54) LOW PRESSURE EGR SYSTEM AND CONTROL METHOD THEREOF

(75) Inventor: Kihoon Nam, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 439 days.

(21) Appl. No.: 13/315,130

(22) Filed: Dec. 8, 2011

(65) Prior Publication Data

US 2012/0312283 A1    Dec. 13, 2012

(30) Foreign Application Priority Data

Jun. 7, 2011    (KR) .................. 10-2011-0054771

(51) Int. Cl.
*F02M 25/07*    (2006.01)
*F02D 41/00*    (2006.01)
*F02M 25/00*    (2006.01)

(52) U.S. Cl.
CPC .............. *F02D 41/005* (2013.01); *Y02T 10/47* (2013.01); *F02D 41/0065* (2013.01); *F02M 25/0727* (2013.01); *F02M 25/0707* (2013.01); *F02M 25/0709* (2013.01)
USPC ..................................... 123/568.11; 701/108

(58) Field of Classification Search
USPC .................. 123/568.11, 568.12, 559.1, 563; 701/108; 60/605.2, 605.1, 278
See application file for complete search history.

(56) References Cited

U.S. PATENT DOCUMENTS

2008/0041051 A1 *    2/2008    Silbermann et al. ......... 60/605.2
2009/0277431 A1 *    11/2009    Nitzke et al. ............. 123/568.12

FOREIGN PATENT DOCUMENTS

| JP | 3620353 B2 | 2/2005 |
| JP | 2009-209784 A | 9/2009 |
| KR | 1020060069900 A | 6/2006 |

* cited by examiner

*Primary Examiner* — Mahmoud Gimie
(74) *Attorney, Agent, or Firm* — Morgan, Lewis & Bockius LLP

(57) ABSTRACT

A control method for a low pressure exhaust gas recirculation (LP-EGR) system may include measuring an engine speed and load, setting a target pressure difference between a downstream side and an upstream side of a LP-EGR valve according to the measured engine speed and load, measuring a present pressure difference between the downstream and upstream sides of the LP-EGR valve, comparing the present pressure difference with the target pressure difference, and preventing a reverse flow of a recirculated exhaust gas by adjusting an opening rate of the LP-EGR valve to alter a recirculated exhaust gas amount when the present pressure difference is smaller than the target pressure difference. The LP-EGR system for preventing reverse flow of a recirculated exhaust gas may include an air intake line, an exhaust line, a LP-EGR line, a LP-EGR valve, pressure sensors and a control portion.

12 Claims, 2 Drawing Sheets

LOW PRESSURE EGR SYSTEM AND CONTROL METHOD THEREOF

CROSS-REFERENCE TO RELATED APPLICATION

The present application claims priority of Korean Patent Application Number 10-2011-0054771 filed in the Korean Intellectual Property Office on Jun. 7, 2011, the entire contents of which application is incorporated herein for all purposes by this reference.

BACKGROUND OF INVENTION

1. Field of Invention

The present invention relates to a low pressure exhaust gas recirculation (EGR) system and a control method thereof. More particularly, the present invention relates to a low pressure EGR system that prevents reverse flow of exhaust gas recirculated to the engine, and a control method thereof.

2. Description of Related Art

Generally, an exhaust gas recirculation system is disposed in an engine to recirculate the exhaust gas to an intake line such that the combustion temperature is decreased to suppress NOx generation.

A target air amount is set according to an operating area of an engine, and an EGR duty ratio is controlled to adjust an EGR gas amount and fresh intake air. The EGR gas amount (flow rate) is set to correspond to the operating area beforehand, and the operating area of the engine is determined to control the EGR valve such that the exhaust gas flow rate (amount) is adjusted.

Particularly, a diesel engine is provided with a turbocharger, which uses energy of the exhaust gas to compress intake air such that the charging efficiency of the air is improved, the engine output is increased, the emission quality is stable, and the fuel efficiency is enhanced.

Also, a low pressure EGR system has been developed so as to reduce emission generation, wherein fresh air is not supplied to the engine and the fresh intake air and the exhaust gas can flow backward to the low pressure EGR line if a high pressure is formed around a join portion where the intake air and the recirculated exhaust gas join together. If the recirculated exhaust gas flows in a counter direction through the low pressure EGR line, the low pressure EGR system cannot reduce the NOx or improve the fuel consumption efficiency.

Accordingly, it is necessary to determine whether the recirculated exhaust gas flows backward in the low pressure EGR line.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a system and a control method thereof having advantages of determining a reverse flow of recirculated exhaust gas in a low pressure EGR line.

Other aspects of the present invention are directed to provide a method for protecting the low pressure EGR system when intake air flows backward in the low pressure EGR line.

Exemplary low pressure EGR system control methods of the present invention may include measuring an engine speed and load, setting a target pressure difference between a downstream side and an upstream side of a low pressure EGR valve according to the measured engine speed and load, measuring a present pressure difference between the downstream and upstream sides of the low pressure EGR valve, comparing the present pressure difference with the target pressure difference, and preventing a reverse flow of a recirculated exhaust gas by adjusting an opening rate of the low pressure EGR valve to alter a recirculated exhaust gas amount when the present pressure difference is smaller than the target pressure difference.

The target pressure difference may be a minimum value that can prevent a reverse flow of the recirculated exhaust gas flowing in the low pressure EGR line.

The low pressure EGR system control method may further include measuring the present pressure difference again after adjusting the opening rate of the low pressure EGR valve, comparing the present pressure difference with the target pressure difference, and performing a debounce for a predetermined time if the present pressure difference is smaller than the target pressure difference. If an error is continuously generated while the debounce is being performed, the low pressure EGR system may be stopped. A warning lamp may be lit to send an alarm while the low pressure EGR system is stopped.

Exemplary low pressure EGR systems of the present invention for preventing reverse flow of recirculated exhaust gas may include an intake line through which intake air is supplied to an engine, an exhaust line through which exhaust gas from an engine flows, an low pressure EGR line that is diverged from the exhaust line and connected to the intake line, an low pressure EGR valve that is disposed on the low pressure EGR line to control recirculated exhaust gas passing through the low pressure EGR line, pressure sensors that are disposed at a downstream side and an upstream side of the low pressure EGR valve, and a control portion that uses the pressure difference measured by the pressure sensors to control an opening rate of the low pressure EGR valve.

The control portion may control the opening rate of the low pressure EGR valve when the present pressure difference measured by the pressure sensors is smaller than a predetermined target pressure difference.

The low pressure EGR system may further include a low pressure EGR cooler that cools the exhaust gas flowing through the low pressure EGR valve. The pressure sensors may be disposed at an upstream side of the low pressure EGR valve and a downstream side of the low pressure EGR cooler.

The low pressure EGR system may further include an emergency filter that is disposed at a downstream side of the low pressure EGR valve. The low pressure EGR valve may be a 3-way valve.

A catalytic converter may be disposed at an upstream side of the low pressure EGR line. The catalyst may include a diesel particulate filter and a diesel oxidation catalyst.

In various low pressure EGR systems of the present invention, the opening rate of the low pressure EGR valve may be controlled when the exhaust gas flows backward in the low pressure EGR system such that an engine malfunction and emissions thereof can be minimized.

Also, in various low pressure EGR systems of the present invention, if the exhaust gas continuously flows backward by a system malfunction, the low pressure EGR system is stopped to protect itself.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
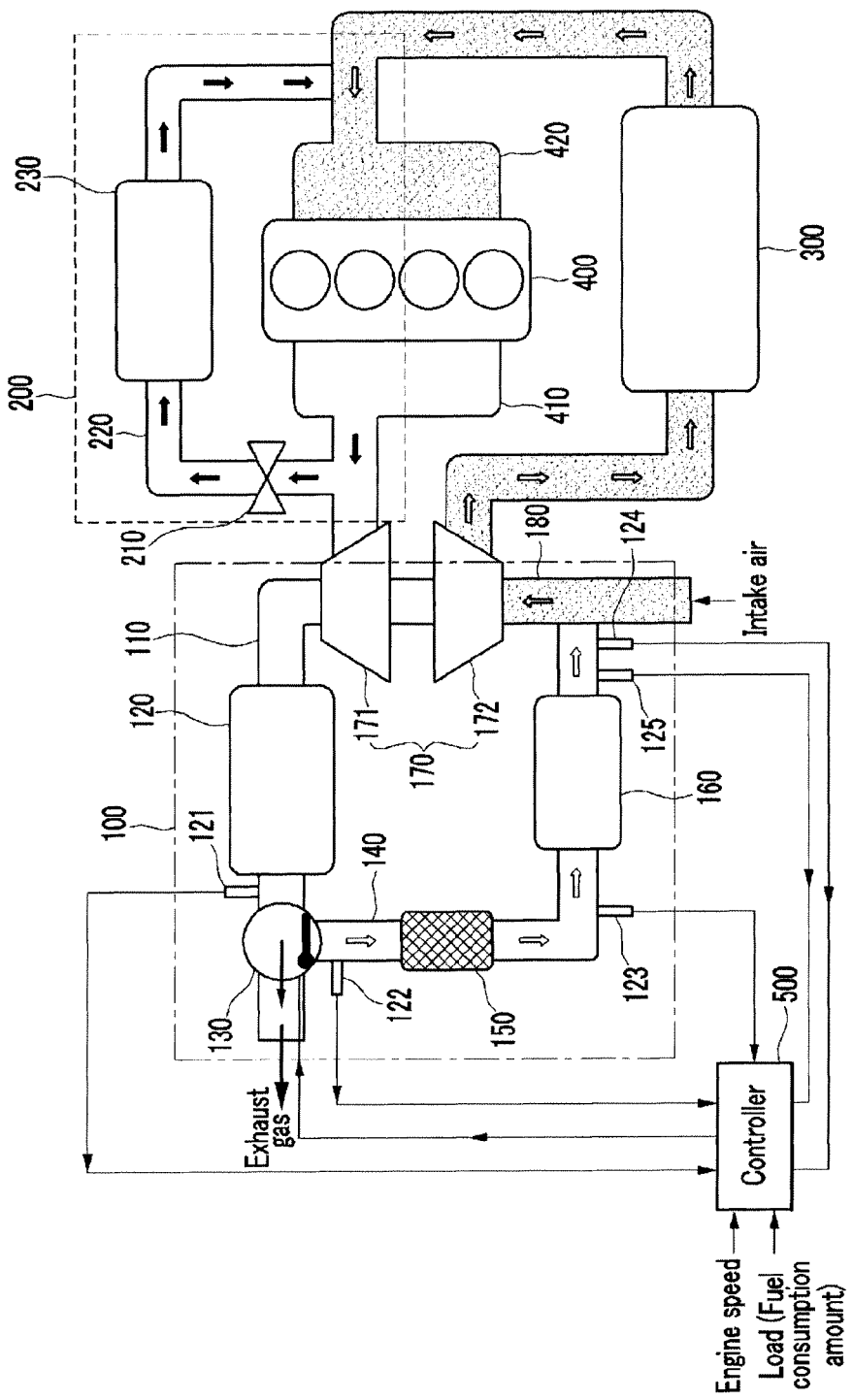
FIG. 1 is a schematic diagram of an exemplary low pressure exhaust gas recirculation (EGR) system according to various aspects of the present invention.

Referring to FIG. 1, an low pressure EGR system 100 according to various embodiments of the present invention includes an intake line 180 that supplies fresh air to an engine, an exhaust line 110 that exhausts the exhaust gas of the engine to the outside, an low pressure EGR line 140 that is diverged from the exhaust line 110 to be connected to the intake line 180 such that the exhaust gas is recirculated to the intake line, an low pressure EGR valve 130 that is disposed on the low pressure EGR line 140 to adjust the amount of recirculated exhaust gas, pressure sensors 121, 122, 123, and 124 that are disposed at a downstream side and an upstream side of the low pressure EGR valve 130 to detect a pressure difference between the downstream side and the upstream side of the low pressure EGR valve, and a control portion 500 that uses the measured pressure difference to control the opening rate of the low pressure EGR valve 130.

Also, the low pressure EGR valve 130 is a 3-way valve, wherein one part of the exhaust gas flowing in the exhaust line 110 is exhausted to the outside and the other part thereof supplies the low pressure EGR line 140 that is diverged from the exhaust line 110 in various embodiments of the present invention. Further, a catalytic converter 120 is disposed on the exhaust line 110, wherein the catalytic converter 120 can include a diesel particulate filter (DPF) and a diesel oxidation catalyst (DOC), and the low pressure EGR valve 130 is disposed at a downstream side of the catalytic converter 120. The DPF is disposed at an upstream side of the exhaust line 110 connected to an engine exhaust manifold 410 to filter particulate matter (PM), and the DOC is disposed at a downstream side of the DPF and oxidizes hydrocarbon and carbon monoxide of exhaust gas and a soluble organic fraction (SOF) of particulate matters to transform them into carbon dioxide and water.

Further, a low pressure EGR cooler 160 that cools the exhaust gas flowing through the low pressure EGR valve 130 is disposed at a downstream side of the low pressure EGR valve 130 in various embodiments of the present invention, and an emergency filter 150 is disposed at a downstream side of the low pressure EGR valve 130 and at an upstream side of the low pressure EGR cooler 160 so as to filter foreign materials included in the low pressure EGR gas.

The pressure sensors 121, 122, 123, and 124 are disposed at a downstream side and an upstream side of the low pressure EGR valve 130, and more particularly, the first pressure sensor 121 is disposed between the low pressure EGR valve 130 and the catalytic converter 120 at the downstream side of the catalytic converter 120, and the other pressure sensors 122, 123, and 124 are disposed at the upstream side (122) of the emergency filter 150, and an upstream side (123) and a downstream side (124) of the low pressure EGR cooler 160. That is, the pressure sensors 122, 123, and 124 that are disposed at the downstream side of the low pressure EGR valve 130 are used to calculate the pressure difference between the downstream side and the upstream side of the low pressure EGR valve 130, wherein the pressure sensors can be disposed at any other position between the low pressure EGR valve 130 and the joining portion where the exhaust gas joins the fresh intake air.

Here, a turbocharger 170 is connected to the exhaust line 110 and the intake line 180. The turbocharger 170 includes a turbine 171 that uses hot and high pressure exhaust gas flowing in the exhaust line 110 to generate rotation energy, and a compressor 172 that is connected to the turbine 171 to compress intake air of the intake line 180 that is connected to the engine 400 so as to supply intake air to the engine 400.

The recirculated exhaust gas and the intake air flowing in the intake line 180 passes through an intercooler 300 to be cooled and is supplied to the engine 400 through an intake manifold 420.

Since the reverse flow of the recirculated exhaust gas is mainly generated along the low pressure EGR line 140, the descriptions is mainly applied to the low pressure EGR line 140, however, as the reverse flow can also be generated in the high pressure EGR line 220, the present invention can be equally applied to the high pressure EGR line 220 in the various embodiments of the present invention.

A high pressure EGR system 200 supplies one part of the high temperature and high pressure exhaust gas that is diverged from the exhaust manifold 410 to the high pressure EGR line 220, wherein a part of the hot and high pressure exhaust gas flowing in the high pressure EGR line 220 passes through a high pressure EGR cooler 230 to be cooled and is mixed with the intake air that passes through the turbocharger 170 to be supplied to the engine 420 through the intake manifold 420.

Here, if the EGR gas passing through the intercooler 300 and the fresh intake air flows backward through the high pressure EGR line 220, the backflow can be prevented by disposing the pressure sensors at a downstream side and an upstream side of an high pressure EGR valve 210 that is disposed on the high pressure EGR line 220 to adjust the high pressure EGR gas amount.

The control portion 500 can prevent the backflow of the recirculated exhaust gas by adjusting the opening rate of the low pressure EGR valve 130 if the pressure difference measured by the pressure sensor is smaller than a predetermined target value in various embodiments of the present invention. That is, the opening rate of the low pressure EGR valve 130 is reduced so as to increase the pressure difference between the rear and front of the low pressure EGR valve 130.

Hereinafter, the control method of the low pressure EGR system 100 for preventing the reverse flow of the recirculated exhaust gas according to various embodiments of the present invention will be described.

Figure 2:
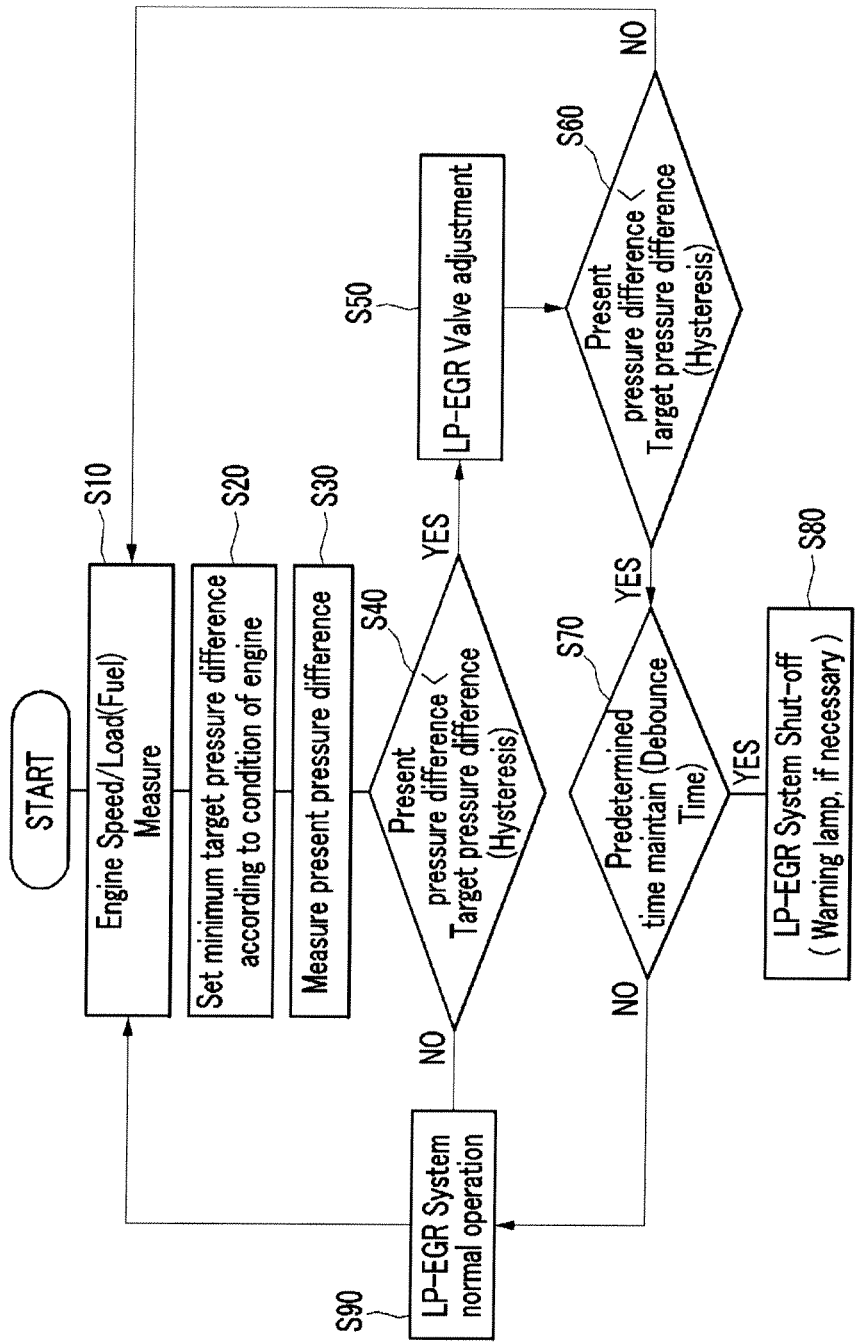
FIG. 2 is a flowchart for preventing reverse flow of a recirculated exhaust gas according to various aspects of the present invention.

FIG. 2 is a flowchart for controlling a low pressure EGR system 100 for preventing reverse flow of recirculated exhaust gas according to various embodiments of the present invention.

First, the engine speed and the engine load are measured in S10, and a minimum target pressure difference between the front and rear of the low pressure EGR valve 130 is set according to the engine speed and the engine load in S20.

The present pressure difference between the front and rear of the low pressure EGR valve 130 is measured in S30. The measured pressure difference is compared with the target pressure difference in S40, and if the present pressure difference is larger than the target pressure difference, it is determined that the low pressure EGR system 100 is being normally operated in S90 and it is returned to S10, where one or more of the engine speed and the engine load are measured. If the present pressure difference is smaller than the target pressure difference, the opening rate of the low pressure EGR valve 130 is controlled to increase the present pressure difference in S50. That is, the pressure difference between the rear and front of the low pressure EGR valve 130 is increased by reducing the opening rate of the low pressure EGR valve 130.

After the present pressure difference is increased as described above, the present pressure difference is again compared with the target pressure difference in S60, wherein if the present pressure difference becomes larger than the target pressure difference, it is determined that the low pressure EGR system 100 is being normally operated to return to the S10 and the engine speed and the load thereof are measured. However, if the present pressure difference is still smaller than the target pressure difference after the present pressure difference is increased, the condition is continued for a predetermined time in S70. The reason for allowing the condition to be continued for a predetermined time is to check whether errors are detected during the predetermined time so as to prepare an abnormal operation of the system for a case that the present pressure difference becomes smaller than the target pressure difference. The predetermined time can be called "debounce time".

Here, the target pressure difference is a minimum value for preventing the reverse flow of the recirculated exhaust gas in the low pressure EGR line 140.

Also, although the opening rate of the low pressure EGR valve 130 is adjusted, when the present pressure difference is smaller than the target pressure difference for the debounce time, the low pressure EGR system 100 is stopped to prevent the reverse flow of the exhaust gas in the low pressure EGR line 140. Here, a warning lamp of the low pressure EGR system 100 is lit to alarm a driver such that the malfunction of the system is prevented beforehand, in S80.

If the recirculated exhaust gas flows backward, air control becomes unstable and the air supply becomes irregular. However, if the opening rate of the low pressure EGR valve 130 is compensated by a signal of the pressure sensors that are disposed at the downstream side and the upstream side of the low pressure EGR valve 130 so as to prevent the reverse flow of the recirculated exhaust gas, the real present pressure difference is increased such that the intake air is stably supplied to the engine.

For convenience in explanation and accurate definition in the appended claims, the terms "downstream" or "upstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A low pressure exhaust gas recirculation (EGR) system control method, comprising:
   measuring an engine speed and load;
   setting a target pressure difference between a downstream side and an upstream side of a low pressure EGR valve according to the measured engine speed and load;
   measuring a present pressure difference between the downstream and upstream sides of the low pressure EGR valve;
   comparing the present pressure difference with the target pressure difference; and
   preventing a reverse flow of a recirculated exhaust gas by adjusting an opening rate of the low pressure EGR valve to alter a recirculated exhaust gas amount when the present pressure difference is smaller than the target pressure difference.

2. The low pressure EGR system control method of claim 1, wherein the target pressure difference is a minimum value that can prevent a reverse flow of the recirculated exhaust gas flowing in the low pressure EGR line.

3. The low pressure EGR system control method of claim 1, further comprising:
   measuring the present pressure difference again after adjusting the opening rate of the low pressure EGR valve;
   comparing the present pressure difference with the target pressure difference; and
   performing a debounce for a predetermined time if the present pressure difference is smaller than the target pressure difference.

4. The low pressure EGR system control method of claim 3, wherein if an error is continuously generated while the debounce is being performed, the low pressure EGR system is stopped.

5. The low pressure EGR system control method of claim 4, wherein a warning lamp is lit to send an alarm while the low pressure EGR system is stopped.

6. A low pressure EGR system for preventing a reverse flow of a recirculated exhaust gas, comprising:
   an intake line through which an intake air is supplied to an engine;
   an exhaust line through which an exhaust gas from the engine flows;
   a low pressure EGR line that is diverged from the exhaust line and connected to the intake line;
   a low pressure EGR valve that is disposed on the low pressure EGR line to control the recirculated exhaust gas passing through the low pressure EGR line;
   pressure sensors that are disposed at a downstream side and an upstream side of the low pressure EGR valve; and
   a control portion that uses a pressure difference measured by the pressure sensors to control an opening rate of the low pressure EGR valve;
   wherein the control portion controls the opening rate of the low pressure EGR valve when the present pressure difference measured by the pressure sensors is smaller than a predetermined target pressure difference.

7. The low pressure EGR system of claim 6, further comprising a low pressure EGR cooler that cools the recirculated exhaust gas flowing through the low pressure EGR valve.

8. The low pressure EGR system of claim 7, wherein the pressure sensors are disposed at an upstream side of the low pressure EGR valve and a downstream side of the low pressure EGR cooler.

9. The low pressure EGR system of claim 6, further comprising an emergency filter disposed at the downstream side of the low pressure EGR valve.

10. The low pressure EGR system of claim 6, wherein the low pressure EGR valve is a 3-way valve.

11. The low pressure EGR system of claim 6, wherein a catalytic converter is disposed at the upstream side of the low pressure EGR line.

12. The low pressure EGR system of claim 11, wherein the catalytic converter includes a diesel particulate filter and a diesel oxidation catalyst.

\* \* \* \* \*